May 15, 1928.  1,669,894
J. J. BLODGETT
WEIGHT INDICATING MEANS FOR MECHANICAL AND OTHER MILKERS
Filed April 6, 1926  2 Sheets-Sheet 2
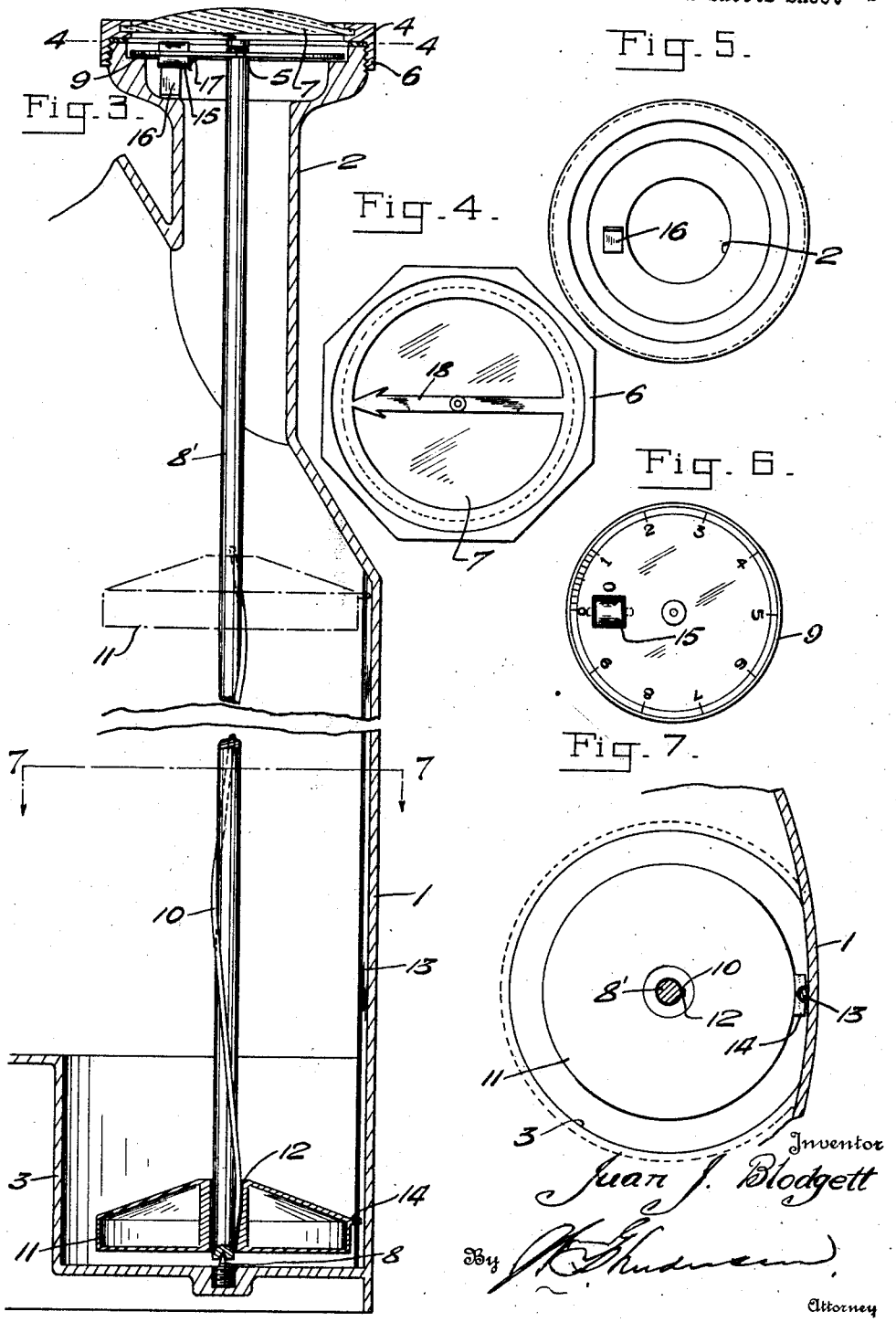

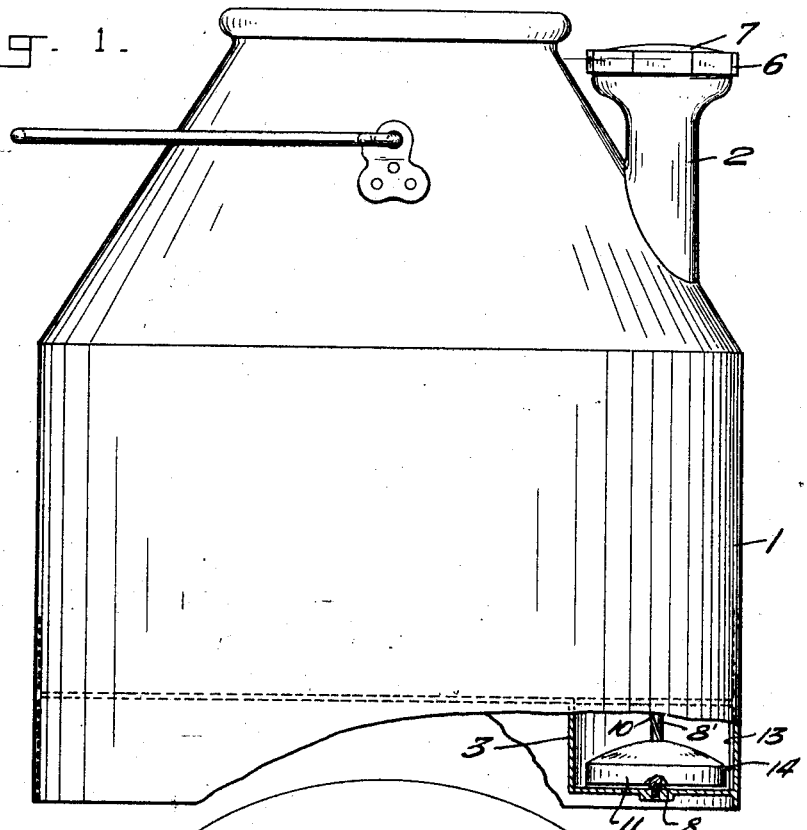
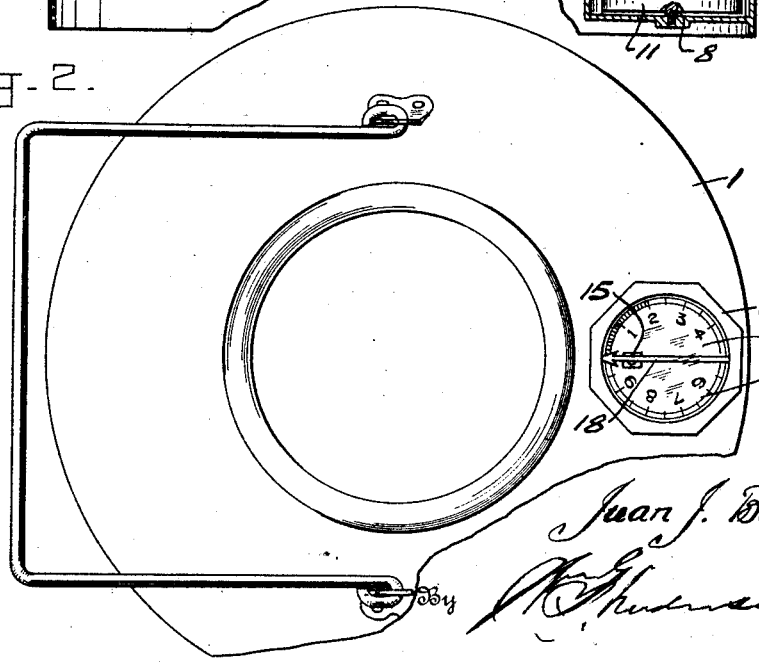

Patented May 15, 1928.

1,669,894

UNITED STATES PATENT OFFICE.

JUAN J. BLODGETT, OF EAST THETFORD, VERMONT.

WEIGHT-INDICATING MEANS FOR MECHANICAL AND OTHER MILKERS.

Application filed April 6, 1926. Serial No. 100,182.

My invention relates to automatic weight indicating means for mechanical and other milkers and proposes the construction of a milk receptacle having means responsive to the depth of liquid in said receptacle for indicating the weight of the contained liquid.

One of the objects of the invention is to have the weight indicating mechanism operate wholly under the sub-atmospheric pressure within said receptacle, or in an open bucket or receptacle as desired.

Another object of the invention is to provide float-actuated weight indicating means, and a well in the bottom of the receptacle for receiving the float, said well being of such proportions as to hold the minimum quantity of liquid necessary to raise the float to its initial weight-indicating position.

A further object of the invention is to provide weight indicating mechanism that can be readily removed from the receptacle and disassembled, for cleansing, or for sterilization of the receptacle, and which can be replaced with equal convenience.

Still another object of the invention resides in the novel construction of indicating mechanism and the associated registering means.

Other objects of the invention will appear as the following description of a preferred embodiment thereof proceeds.

In the drawings,

Figure 1 is a side elevation, partly in section, of the milk receptacle of a mechanical milker, embodying my invention;

Figure 2 is a plan view of the same in part broken away;

Figure 3 is a sectional elevation through a side of the milk receptacle, and the weight indicating means;

Figure 4 is an underneath plan view of the cap, showing the washer and clock-hand;

Figure 5 is a plan view of the dial tube;

Figure 6 is a plan view of the dial with the registering wheel;

Figure 7 is a section taken along the line 7—7 of Fig. 3.

Referring now in detail to the several figures, the numeral 1 represents the milk receptacle of a mechanical milking system, adapted to be placed in communication, in a usual manner which it is not thought necessary here to show, with the milk tubes and vacuum pump of the milking system. It is to be understood that the chamber of said receptacle is normally, when the milker is in operation, at sub-atmospheric pressure, if it be a mechanical milker.

For the purpose of carrying out my invention the receptacle 1 is provided to one side with a vertical tube 2, hereinafter referred to as the dial tube and with a well 3, in vertical axial alinement with the dial tube and extending below the bottom of the receptacle.

The upper end of the dial tube is flared to receive the dial and registering mechanism, and provided with a peripheral washer 4 carrying a needle point bearing 5. The washer is held in place by a ring nut 6, the latter carrying the lens or other sight glass 7. When the washer 4 is in place the bearing 5 is in true vertical alinement with a needle point bearing 8 suitably arranged at the bottom of the well 3.

A vertical shaft 8' is journalled on said bearing, carrying a dial 9 at its upper end in proximity to the lens 7, and being provided with a spiral spline or feather 10. A float 11 is freely reciprocable upon said shaft, said float being formed with a groove 12 having the pitch of the spiral feather, and receiving the latter. Rotation of the float is inhibited by means of a fixed vertical rod 13 in said receptacle, engaged by an indented lug 14 carried by said float. The effect of this construction is to cause the shaft 8' to rotate, and with it the dial 9, when the float rises.

However, the liquid which actuates the float must rise to a certain depth to begin to lift the float, and the latter, due to the inevitable lost motion eventuating from the play between the float and shaft, will not begin to rotate the shaft until it has risen still higher. It is evident that the indicating means will be unresponsive to the initial quantity of liquid introduced into the receptacle, and it is for the purpose of minimizing this unweighed quantity of liquid that the well 3 is made of the minimum diameter to freely receive the float, and of the depth that the float must rise before it begins to turn the shaft 8'. That part of the receptacle 2 above the well 3 and coextensive with upper range of travel of the float is preferably made of uniform diameter so that the weights of different quantities of contained liquid are directly proportional to the depths to which said quantities rise in the receptacle, that is to say, directly proportional to the rise of the float.

The dial is circumferentially calibrated with a scale representing unit pounds, and as the receptacle is advantageously made of a size to hold, say, forty pounds, a tens wheel 15 is provided and carried by the dial and adapted at each revolution of the latter to pass into engagement with a finger 16 fixed within the dial tube and to be partially rotated thereby, to bring the tens numerals inscribed upon said wheel, successively into view, upon successive revolutions of said dial. The tens wheel 15 is preferably pressed by a light brake 17, to prevent inertia oscillations. A stationary arrow or other suitable index 18 is provided in juxtaposition to the dial, by which the angular movement of the dial may be indicated.

The lens 7 is fitted to the ring nut 6 in an air tight manner, and the washer 4 also preserves the receptacle from atmospheric leakage, so that the weight indicating mechanism operates wholly in vacuum, the use of stuffing boxes, with their attendant friction being thereby avoided.

While I have hereinbefore described what I believe to be a preferred and practical embodiment of my invention, it is to be understood that the exercise of the invention is by no means limited to the particular construction herein disclosed but restricted only by the express terms of the appended claims, and that features may be used in a bucket or receptacle open to the atmosphere.

Having fully described my invention and set forth its merits, what I claim is:—

1. In combination with a liquid receptacle having an opening in the top thereof, removable means including a transparent portion hermetically sealing said opening, the bottom of said receptacle being formed with a well in line with said opening; a rotatable shaft, circular in cross-section, vertically journaled in alinement with said well and opening and formed with a spirally disposed spline, a float having a normal position of repose in said well when the receptacle is empty and formed with a circular opening formed with a groove to receive the spline of the rotatable shaft, said float being freely reciprocable on said shaft, means for inhibiting rotary movement of the float, and a dial carried by the rotatable shaft and rotatable therewith beneath said sealing means and visible through said transparent portion.

2. In combination with a liquid receptacle having an opening in the top thereof and a well in the bottom in line with said opening; a rotatable shaft vertically journaled in alinement with said well and opening and formed with a spirally disposed spline, a float formed with an opening to receive the spline of the shaft and reciprocable on the shaft, means for inhibiting rotary movement of the float, a dial inscribed with indicia of units and carried by said shaft to be rotatable therewith, a revoluble wheel inscribed with indicia of multiples of the number of units indicia of the dial and rotatably mounted on the dial on a radial axis, and stationary means disposed to be engaged by said revoluble wheel at each rotation of said dial for imparting a step-by-step rotation to said wheel.

3. In combination with a liquid receptacle having an opening in the top thereof and a well in the bottom in line with said opening; a rotatable shaft vertically journaled in alinement with said well and opening and formed with a spirally disposed spline, a float formed with an opening to receive the rotatable shaft and a groove to receive the spline of the shaft and reciprocable on the shaft, means inhibiting rotary movement of the float, a dial inscribed with indicia of units and carried by said shaft to be rotatable therewith, an index disposed in a fixed relation to the rotatable dial, a revoluble wheel inscribed with indicia of multiples of the number of units indicia of the dial and rotatably mounted on the dial on a radial axis, and stationary means disposed to be engaged by said revoluble wheel at each rotation of said dial for imparting a step-by-step rotation to said wheel, the rotatable dial and index being positioned to be visible through the opening in the top of the liquid receptacle.

In testimony whereof I affix my signature.

JUAN J. BLODGETT.